United States Patent [19]

Warner

[11] Patent Number: 5,086,622

[45] Date of Patent: Feb. 11, 1992

[54] ENVIRONMENTAL CONTROL SYSTEM CONDENSING CYCLE

[75] Inventor: John L. Warner, Simsbury, Conn.

[73] Assignee: United Technologies Corporation, Hartford, Conn.

[21] Appl. No.: 570,100

[22] Filed: Aug. 17, 1990

[51] Int. Cl.⁵ ............................................. F25B 9/06
[52] U.S. Cl. ........................................ 62/88; 62/172; 62/402
[58] Field of Search ............... 62/86, 87, 88, 113, 62/172, 401, 402, 513

[56] References Cited

U.S. PATENT DOCUMENTS

| Re. 32,100 | 4/1986 | Rannenberg | 62/80 |
|---|---|---|---|
| 2,485,522 | 10/1949 | Anderson | 236/44 |
| 2,526,103 | 10/1950 | Wood . | |
| 2,585,570 | 2/1952 | Messinger et al. . | |
| 2,622,406 | 12/1952 | Scofield et al. . | |
| 2,628,481 | 2/1953 | Scofield et al. . | |
| 2,734,443 | 2/1956 | Wood . | |
| 2,767,561 | 10/1956 | Seeger . | |
| 2,829,505 | 4/1958 | Oates, Jr. . | |
| 2,867,989 | 1/1959 | McGuff | 62/150 |
| 2,979,916 | 4/1961 | Mason | 62/172 |
| 3,080,728 | 3/1963 | Groves et al. | 62/172 |
| 3,093,470 | 6/1963 | Melikiani et al. . | |
| 3,177,676 | 4/1965 | Abrahams | 62/172 |
| 3,177,679 | 4/1965 | Quick et al. . | |
| 3,222,883 | 12/1965 | Glaspie | 62/172 |
| 3,289,436 | 12/1966 | Groves et al. | 62/402 |
| 3,369,777 | 2/1968 | Furlong | 244/59 |
| 3,494,145 | 2/1970 | Davis et al. | 62/88 |
| 3,623,332 | 11/1971 | Fernandez | 62/88 |
| 3,877,246 | 4/1975 | Schutze | 62/402 |
| 4,127,011 | 11/1978 | Gilles et al. | 62/402 |
| 4,334,411 | 6/1982 | Payne | 62/86 |
| 4,352,273 | 10/1982 | Kensell et al. | 62/87 |
| 4,374,469 | 2/1983 | Rannenberg | 62/402 |
| 4,430,867 | 2/1984 | Warner | 62/402 |
| 4,580,406 | 4/1956 | Nims | 62/87 |
| 4,829,775 | 5/1989 | Defrancesco | 62/90 |

OTHER PUBLICATIONS

Asme-Chilled Recirculation ECS for Aircraft, by G. C. Rannenberg, Jul. 1979.

Primary Examiner—Harry B. Tanner
Attorney, Agent, or Firm—William W. Habelt

[57] ABSTRACT

In an air cycle environmental control system, a condenser (46) removes water vapor from compressed, ambient, supply air (9) before it is expanded in a first turbine (24). The chilled outlet air (49) from the first turbine (24) is then used as coolant in the condenser (46), absorbing there the heat of vaporization of the condensed water vapor. After passing through the condenser (46), the warmed coolant is then expanded in a second turbine (26). Should the pressure of the supply air fall below predetermined levels, portions of the cycle that degrade performance or become unnecessary are bypassed.

18 Claims, 1 Drawing Sheet

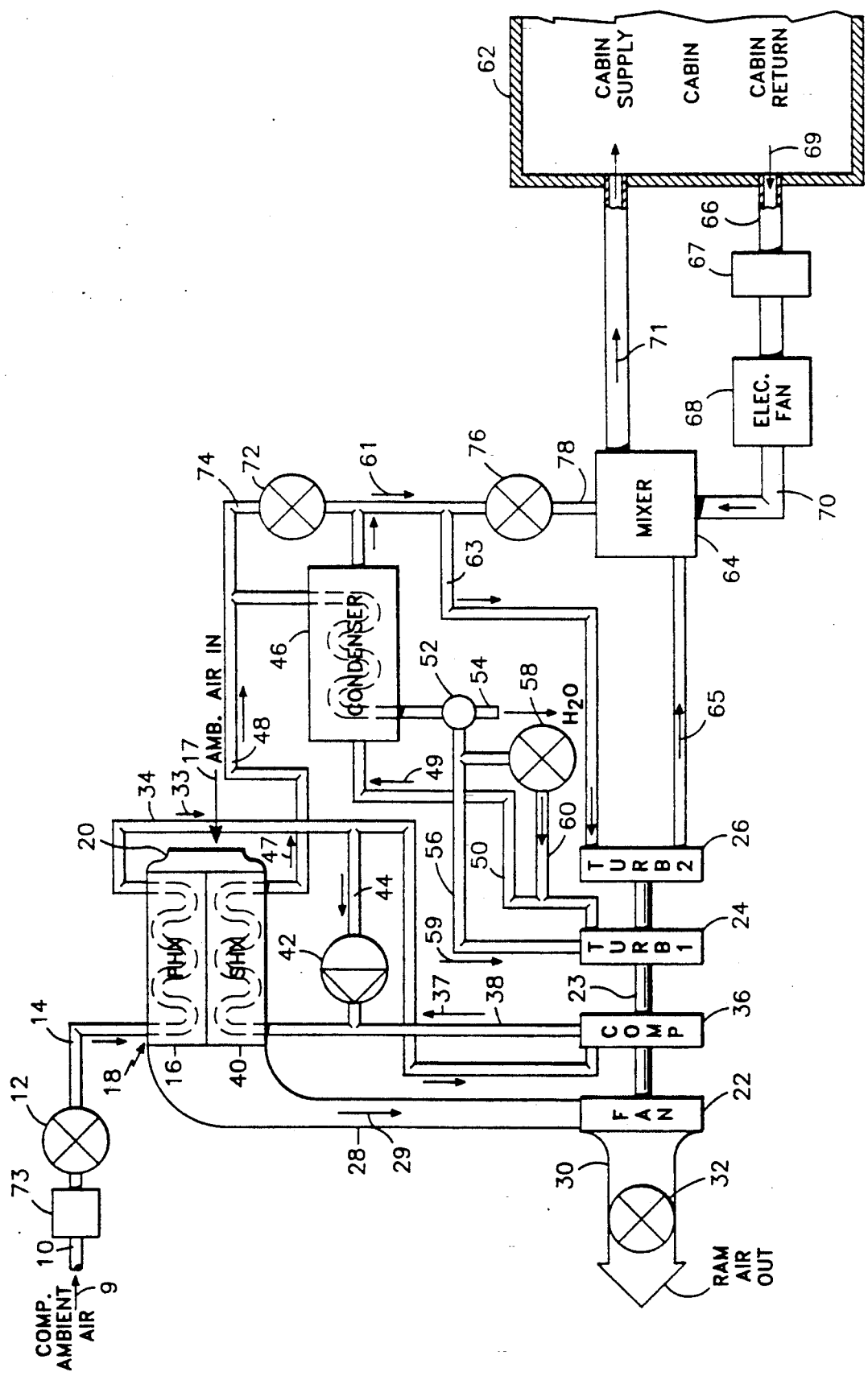

ENVIRONMENTAL CONTROL SYSTEM CONDENSING CYCLE

TECHNICAL FIELD

This invention relates to air cycle environmental control systems that condition air.

BACKGROUND ART

Aircraft designed to operate in rarefied atmosphere typically employ an air cycle environmental control system to cool, filter, pressurize, and otherwise condition cabin air. In most installations, compressed ambient air, provided by either the engine compressor section, the auxiliary power unit, or both, is expanded in an air cycle turbomachine, providing a cool, fresh, air supply for the cabin. The costs of this cool, fresh, air supply are twofold. First, due to the size and number of components required for their assembly, these systems can appreciably increase the gross weight of the aircraft. Second a considerable amount of energy, stored in the compressed, ambient, supply air, is needed to satisfy the cooling requirements of even an average-sized aircraft. In an industry faced with increasing fuel costs and heightened environmental concerns, considerable effort is made to reduce, without sacrificing overall system performance, both the weight and energy requirements of these systems.

Since compressed ambient air is readily available, it is a convenient source of power for airborne environmental control systems. In most systems, the compressed, ambient air is passed through a heat exchanger cooled by air from outside the aircraft, lowering its temperature to around ambient air temperature. To further lower the temperature of the compressed ambient air, it is expanded in a turbine. If the temperature of the expanded air falls below its dew point, any water vapor entrained in it will condense. Should expansion lower further, to below the freezing point, the temperature of the compressed, ambient air, the condensed water freezes. In sufficient quantities, the resulting ice restricts flow through the system and decreases performance, possibly to the point where the system becomes inoperable.

Many prior art systems employ one or both of two techniques to ensure that no ice forms that might clog the system. The first of these approaches is to simply design the turbine such that temperature of its outlet air remains above the freezing point. Not only is it then impossible for ice to form, but the size of the heat exchanger, a bulky component accounting for a significant percentage of overall system weight, may be reduced. However, systems of this nature require far more energy to produce a desired amount of cooling than systems in which turbine outlet air temperature is allowed to fall below the freezing point.

The second approach taken in these systems is to operate the turbines below the freezing point and provide the system with the capability both to sense the presence of ice and to deliver warm deicing flow to the regions where an unacceptable level of ice accumulation is indicated. The benefit of this type of system is that the deicing mechanism is operational, and therefore extracts energy from the system, only when ice is detected. Delivering warm deicing flow, however, requires additional hardware that increases the overall weight of the system. In U.S. Pat. No. 3,177,679, when thermostats in the outlets of each of two turbines indicate temperatures below freezing, valves in ducts connecting the turbine outlets with warmer air sources open. In U.S. Pat. No. 4,127,011, a plenum encases the outlet of a turbine. When the temperature within that turbine outlet falls below freezing, valves open to deliver warm air into the plenum, preventing ice from accumulating on the inside surface of the turbine outlet.

An alternative to this second approach is to operate system turbines below the freezing point and mix a continuous flow of warm air with the turbine outlet air to raise its temperature. In U.S. Pat. No. 3,877,246, a system with two turbines employing this technique is described. The outlet air of the first turbine mixes with warm air both recirculated from the cabin and compressed, enabling it to operate below the freezing point. This mixture then expands in a second turbine. Before entering the cabin, the outlet air exhausted from this second turbine passes first through a precipitator to remove any entrained water vapor. To maintain the temperature of air downstream of the second turbine above freezing, a valve in a duct connecting the inlet of the second turbine to the outlet of the second turbine is modulated. A similar system, but with a single turbine, is described in U.S. Pat. No. 2,628,481. Recirculated cabin air is first filtered and then split. The first half of this split, recirculated air mixes directly with the air exiting the turbine. Water vapor entrained in this mixture is then removed in a water separator. The flow exiting the separator then mixes with the second half of the recirculated cabin air before entering the aircraft.

U.S. Pat. No. RE32,100 (reissue of U.S. Pat. No. 4,209,993) and 4,430,867 both describe single-turbine systems that also use the heat contained in recirculated air to maintain the temperature of air downstream of the turbine above the freezing point. Before entering the turbine inlet, compressed supply air first passes through the warm path of a primary condenser, removing entrained water vapor. The dehumidified air exiting the warm path of the condenser is then expanded in the turbine. In U.S. Pat. No. RE32,100, the outlet air exiting this turbine then mixes with warm cabin recirculation air and passes through the cold path of the condenser. In U.S. Pat. No. 4,430,867, the outlet air exiting the turbine passes first into the cold path of a heat exchanger before entering the cabin. Fluid passing through the warm path of the heat exchanger passes first through the cold path of a secondary condenser located in the cabin. Recirculated air is drawn through the warm path of this secondary condenser, dehumidifying it before passing it back into the cabin. The fluid, warmed in the cold path of the secondary condenser, passes subsequently to the cold path of the primary condenser before circulating back to the heat exchanger.

The systems disclosed in both U.S. Pat. No. RE32,100 and 4,430,867, by providing means for the removal of water vapor from the air stream prior to expansion within the turbine, allow the turbine to operate at more efficient subfreezing temperatures. However, these systems fail to recover the heat of vaporization yielded when water vapor is condensed from the turbine inlet stream, contributing to an overall loss of cycle efficiency and cooling capacity.

DISCLOSURE OF INVENTION

Objects of the invention include increasing the efficiency of air cycle environmental control systems through recovery of the heat of vaporization stored in water vapor contained in compressed ambient air.

Further objects of the invention include providing means in such systems to change the cycle for optimal system efficiency under varying ambient conditions.

According to the present invention, air exiting a first turbine of a system is expanded in a second turbine after being used to condense water vapor in the compressed ambient supply air entering the first turbine.

According further to the present invention, the system includes means to bypass portions of the cycle that degrade performance or become unnecessary as the characteristics of the compressed ambient air supplying the system vary.

Due to the increased thermal efficiency realized by recovering the heat of vaporization, embodiments of the present invention have either greater airflow and cooling capacity than prior art systems of the same weight and size, or airflow and cooling capacity equal to heavier and larger prior art systems.

Additionally, the first and second turbine expansion ratios may be chosen to ensure that the first turbine outlet airflow remains above freezing, as energy not extracted in this turbine will be recovered by the second. This reduces icing concerns in the condenser, allowing for only moderate deicing means.

In the dry, low pressure atmosphere encountered at cruise altitudes, the invention further provides for selectively bypassing both the first turbine stage and the condensing heat exchanger, passing flow directly to the second turbine. As the the first turbine has a smaller nozzle area than the second, and as the compressor restricts flow, bypassing these two components increases the volume flow rate through the system. In even lower pressure atmosphere where the nozzle area of the second turbine is too small to allow sufficient mass flow, the second turbine is also bypassed, and maximum flow, through the system is attained.

The foregoing and other objects, features, and advantages of the present invention will become more apparent in the light of the following detailed description of exemplary embodiments thereof, as illustrated in the accompanying drawings.

BRIEF DESCRIPTION OF DRAWING

The sole Figure is a schematic diagram of an air cycle environmental control system incorporating the present invention.

BEST MODE FOR CARRYING OUT THE INVENTION

Referring now to the Figure, compressed ambient supply air 9 enters an air cycle environmental control system via a duct 10. The source of this air (not shown) may be either an auxiliary power unit, the compressor section of a gas turbine engine, or both. The flow rate of compressed air entering the system is regulated by a valve 12 connected by a duct 14 to a warm path of a primary heat exchanger 16. To cool air in this warm path, relatively cool external ambient air 17 flows into an opening 20 at the exterior of the aircraft (not shown) and through a cooling path. To maintain sufficient flow through this cooling path during low airspeed operation, a fan 22, driven by a pair of turbines 24, 26 via a shaft 23, connects to the outlet of the cooling path via a duct 28, drawing warmed external ambient air 29 through the path and exhausting it from the aircraft via a duct 30. A valve 32 in this fan exhaust duct 16 may be modulated to regulate the cooling flow rate.

Following cooling in the warm path of the primary heat exchanger 16, primary heat exchanger outlet air 33 flows through a duct 34 to a compressor 36, also driven by the two turbines 24, 26. Compressor outlet air 37, heated by this compression step, subsequently passes via a duct 38 to a warm path of a secondary heat exchanger 40, where it is cooled by the external ambient air 17 flowing through a cooling path, similar to the aforementioned cooling means of the primary heat exchanger 16.

Secondary heat exchanger outlet air 47 exiting the warm path of the secondary heat exchanger 40 subsequently flows via a duct 48 to the condensing flowpath of a condenser 46. The temperature of the heat transfer surface within this condenser 46 is maintained at or below the desired dew point of the secondary heat exchanger outlet air 47. This dehumidifies the secondary heat exchanger outlet air 47 before it flows to the first turbine 24 via a duct 56. Cooled by expansion in the first turbine, the first turbine outlet air flows to a cooling path of the condenser 46 via a duct 50, chilling the heat transfer surfaces and absorbing the heat of vaporization of the condensed water vapor. The expansion ratio of the first turbine 24 is therefore chosen to maintain a first turbine outlet air 49 temperature high enough to avoid icing, given the mass flow rate through the system, within the coolant path of the condenser 46. In most applications, the desired temperature of the first turbine outlet air 49 is between 35 and 40 degrees Fahrenheit (1.7 to 4.4 degrees Celsius). Should the actual first turbine outlet temperature fall below the desired point, or if by some means the presence of ice is sensed in the condenser 46, a valve 58 opens to allow dehumidified first turbine inlet air 59 to pass through a duct 60 and mix with and warm the first turbine outlet air 49.

Numerous methods may be employed to sense the accumulation of ice. A pressure sensor (not shown) may be placed at the inlet and outlet of the coolant path of the condenser 46. Should the pressure drop across the coolant path exceed some predetermined level, it may be concluded that sufficient ice has formed in the path to restrict flow. As an alternative, the outlet of an orifice (not shown) connected to a cool, high pressure air source may be placed to exhaust into the coolant path of the condenser 46. The size of the orifice is selected to allow only a small amount of flow to pass through it. Should flow or pressure sensors monitoring the air flowing into this orifice indicate that pressure has increased or flow has decreased, it may be concluded that ice has formed in and clogged the nozzle opening.

As secondary heat exchanger outlet air 47 passes through the condensing path of the condenser 46, the heat of vaporization of any water vapor mixed with it is recovered, upon condensation, by the first turbine outlet air 49 in the cooling path. The total recoverable energy stored in the condenser cooling path outlet air 61 is therefore the sum of this recovered heat of vaporization and any energy not recovered by the first turbine 24. To recover this energy, the condenser cooling path outlet air 61 passes through a duct 63 and expands in the second turbine 26.

To moderate the volume and temperature of the airflow passing into the aircraft cabin 62, the second turbine outlet air 65 passes into a mixer 64 where it is combined with recirculated cabin air 69. A fan 68 draws this recirculated air 69 from the cabin 62 through both a duct 66 and a filter 67. The speed of the fan 68 is controlled to provide the mass flow rate of recirculation air 69 through a duct 70 and into the mixer 64 required to satisfy overall circulation requirements.

The system according to the present invention is also able to accommodate changes in ambient and operating conditions which would otherwise reduce overall system operability and efficiency. Should pressure of the compressed ambient air 9 be too low, mass flow, sensed, for example, by a hot wire anemometer 73, drops below the level necessary to satisfy cabin fresh air flow requirements. A primary bypass valve 72 then opens, allowing flow to bypass both the condenser 46 and the first turbine 24, circulating, through a duct 74, secondary heat exchanger outlet air 47 directly to the second turbine. The primary bypass valve 72 typically opens when the aircraft is at the high altitudes encountered at cruise, when the external ambient air 17, and therefore the supply air 9, are low in pressure and humidity. The expansion ratios and nozzle sizes of both turbines 24, 26 have been selected to optimize system performance in the higher pressure ambient air found at lower altitudes where humidity is a concern.

The second turbine is designed to expand air previously expanded by the first turbine, and therefore has a larger nozzle far less restrictive to flow than the first turbine nozzle. Flow passing directly to the second turbine 26 is therefore much less restricted than flow passing first to the condenser 46 and first turbine 24. By decreasing restriction to flow, greater volume flow rates may be sustained during periods when supply air pressure is low, allowing a sufficient mass flow rate of air to enter the cabin.

Should the primary bypass valve 72 be fully open, and the hot wire anemometer 73 indicate that the mass flow rate of compressed ambient air 9 is still below the minimum rate specified for the system, a secondary bypass valve 76 also opens. In addition to the first turbine 24 and the condenser 46, flow then also bypasses the second turbine 26, passing secondary heat exchanger outlet air 47 directly through a secondary bypass duct 78 and into the mixer 64. In this situation, as neither turbine 24, 26 is driven, the compressor 36 and fan 22 stop. The compressor 36 then acts as a flow restriction, and the pressure at the compressor outlet drops below the inlet pressure. This opens a check valve 42 located in a duct 44 connecting the inlet to the outlet of the compressor, allowing primary heat exchanger outlet air 33 to bypass the compressor and flow directly to the secondary heat exchanger 40. Under these conditions, therefore, compressed ambient air 9 passes directly from the primary 16 to the secondary 40 heat exchanger and into the mixer 64, allowing maximum volume flow through the system.

Even when the mass flow rate of the compressed ambient air 9 is sufficient, the secondary bypass valve 76 can be modulated to regulate the cooling capacity and volume flow through the system. Should either the volume flow rate or the temperature of air 65 exiting the second turbine outlet be too low, the secondary bypass valve 76 is opened.

Although the invention has been shown and described with respect to exemplary embodiments thereof, it should be understood by those skilled in the art that various changes, omissions, and additions may be made therein and thereto, without departing from the spirit and scope of the invention.

What is claimed is:

1. A method for conditioning water-vapor bearing compressed air for supply as conditioned air to an enclosure, comprising the steps of:
   condensing and removing water vapor from said water-vapor bearing compressed air thereby dehumidifying said air;
   expanding said dehumidified air in said condensing step in a first turbine;
   passing said dehumidified air expanded in said first turbine in heat exchange relationship with said water-vapor bearing compressed air as coolant in said condensing step;
   expanding said dehumidified air warmed in said condensing step in a second turbine; and
   supplying said conditioned air expanded in said second turbine to the enclosure.

2. The method according to claim 1, further comprising the step of evaluating the mass flow rate of said supply air.

3. The method according to claim 2, further comprising the step of supplying, responsive to the mass flow rate of said supply air falling below a first preselected level, said supply air directly to the inlet of said second turbine.

4. The method according to claim 3, further comprising the step of supplying, responsive to the mass flow rate of said supply air falling below a second preselected level, said supply air directly to the outlet of said second turbine.

5. An air cycle environmental control system for conditioning water-vapor bearing compressed air for supply to an enclosure as conditioned air, comprising:
   a condensing heat exchanger having a condensing flowpath and coolant flowpath arranged in heat exchange relationship;
   a first turbine operable to expand the compressed air being conditioned so as to cool the compressed air being conditioned to a first temperature;
   a second turbine operable to further expand the compressed air previously expanded in said first turbine so as to cool the compressed air being conditioned to a second temperature;
   means for delivering the water-vapor bearing compressed air to be conditioned to the condensing flowpath of said condensing heat exchanger wherein the water-vapor bearing compressed air passes through the condensing flowpath in heat exchange relationship with a cooling fluid passing through the coolant flowpath of said condensing heat exchanger whereby the compressed air is sufficiently cooled to dehumidify the compressed air by condensing at least a portion of the water-vapor therefrom;
   a first duct in flow communication between said first turbine and the condensing flowpath of said condensing heat exchanger for conveying the dehumidified compressed air to said first turbine to be expanded therein;
   a second duct in flow communication between said first turbine and the coolant flowpath of said condensing heat exchanger for conveying the compressed air expanded in said first turbine to the coolant flowpath of said condensing heat exchanger as said cooling fluid;
   a third duct in flow communication between said second turbine and the coolant flowpath of said condensing heat exchanger for conveying compressed air passing from the coolant flowpath of said condensing heat exchanger to said second turbine to be further expanded therein; and a fourth duct in flow communication between said second turbine and the enclosure for delivering the air expanded in said second turbine to the enclosure.

6. The system according to claim 5, wherein said first turbine has an expansion ratio such that the first temperature to which the dehumidified compressed air expanded therein is cooled between the dew point of the dehumidified compressed air and the freezing point of the dehumidified compressed air passing through the coolant path of said condensing heat exchanger.

7. The system according to claim 6, wherein said first turbine has a turbine nozzle and said second turbine has a turbine nozzle, the turbine nozzle of said second turbine being substantially less restrictive to flow than the turbine nozzle of said first turbine.

8. The system according to claim 5, further comprising a fifth duct in flow communication between said first duct and said second duct for bypassing a portion of the dehumidified compressed air from said first duct past said first turbine into said second duct.

9. The system according to claim 8 further comprising:
 means for detecting icing within the coolant path of said condensing heat exchanger; and
 a bypass control valve operatively disposed within said fifth duct and responsive to said icing detection means for selectively bypassing a portion of the dehumidified compressed air from said first duct through said fifth duct into said second duct.

10. The system according to claim 5 further comprising a sixth duct in flow communication between said third duct and said means for delivering the water-vapor bearing compressed air to be conditioned to said condensing heat exchanger for bypassing a portion of the water-vapor bearing compressed air about said condensing heat exchanger and said first turbine into said third duct for supply directly to said second turbine.

11. The system according to claim 10 further comprising:
 means for determining the mass flow rate of water-vapor bearing compressed air being delivered to the system to be conditioned; and
 a bypass control valve operatively disposed within said sixth duct and responsive to said mass flow rate determining means for selectively bypassing a portion of the water-vapor bearing compressed air being delivered to said condensing heat exchanger through said sixth duct about said condensing heat exchanger and said first turbine directly to said second turbine.

12. The system according to claim 5 further comprising a seventh duct in flow communication between said fourth duct and said means for delivering the water-vapor bearing compressed air to be conditioned to said condensing heat exchanger for bypassing a portion of the water-vapor bearing compressed air about said condensing heat exchanger, said first turbine and said second turbine into said fourth duct for supply directly to the enclosure.

13. The system according to claim 12 further comprising:
 means for determining the mass flow rate of the water-vapor bearing compressed air being delivered to the system to be conditioned; and
 a bypass control valve operatively disposed within said seventh duct and responsive to said mass flow determining means for selectively bypassing a portion of the water-vapor bearing compressed air being delivered to said condensing heat exchanger through said seventh duct about said condensing heat exchanger, said first turbine and said second turbine directly to said fourth duct for supply to the enclosure.

14. The system according to claim 5 wherein said means for delivering the water-vapor bearing compressed air to be conditioned to the condensing flowpath of said condensing heat exchanger comprises:
 a compressor disposed upstream of the condensing flowpath of said condensing heat exchanger, said compressor operable to further pressurize the water-vapor bearing compressed air to be conditioned prior to its passing through the condensing flowpath;
 a supply duct in flow communication between a source of the water-vapor bearing compressed air and said compressor for conveying the water-vapor bearing compressed air to said compressor to be further compressed therein; and
 a delivery duct in flow communication between said compressor and the condensing flowpath of said condensing heat exchanger for conveying the water-vapor bearing compressed air further pressurized in said compressor to the condensing flowpath of said condensing heat exchanger.

15. The system according to claim 14 wherein said compressor, said first turbine and said second turbine are operatively mounted to a common shaft whereby said first turbine and said second turbine power said compressor.

16. The system according to claim 15 further comprising a fan mounted to said common shaft whereby said first turbine and said second turbine power said compressor and said fan.

17. The system according to claim 16 further comprising:
 a primary heat exchanger operatively associated with said supply duct and having a heat exchange flowpath and a cooling flowpath arranged in heat exchanger relationship whereby the water-vapor bearing compressed air passing through said supply duct is cooled as it traverses the heat exchange flowpath thereof in heat exchange relationship with a flow of cooler ambient air passing through the cooling flowpath thereof, thereby cooling the water-vapor bearing compressed air prior to entering said compressor; and
 a secondary heat exchanger operatively associated with said delivering duct and having a heat exchange flowpath and a cooling flowpath arranged in heat exchange relationship whereby the further pressurized water bearing compressed air passing through the said delivery duct is cooled as it traverses the heat exchange flowpath thereof in heat exchange relationship with a flow of cooler ambient air passing through the cooling flowpath thereof, thereby cooling the further pressurized water-vapor bearing compressed air prior to entering the condensing flowpath of said condensing heat exchanger, said fan operative to cause the cooler ambient air to flow through the cooling flowpath of said primary and secondary heat exchangers.

18. The system according to claim 14 further comprising:
- a condenser bypass duct in flow communication between said delivery duct and said fourth duct for bypassing a portion of the water-vapor bearing compressed air about said condensing heat exchanger, said first turbine and said second turbine into said fourth duct for supply directly to the enclosure;
- means for determining the mass flow rate of the water-vapor bearing compressed air passing through said supply duct;
- a bypass control valve operatively disposed within said condensor bypass duct and responsive to said mass flow determining means for selectively bypassing a portion of the water-vapor bearing compressed air being delivered to said condensing heat exchanger through said condensor bypass duct;
- a compressor bypass duct in flow communication between said supply duct and said delivery duct for bypassing the water-vapor bearing compressed air from said supply duct about said compressor into said delivery duct; and
- check valve means operatively disposed within said compressor bypass duct and responsive to said bypass control valve so as to open when said bypass control valve is fully open thereby permitting substantially all of the water-vapor bearing compressed air to bypass said compressor.

* * * * *